United States Patent Office 3,093,342
Patented June 11, 1963

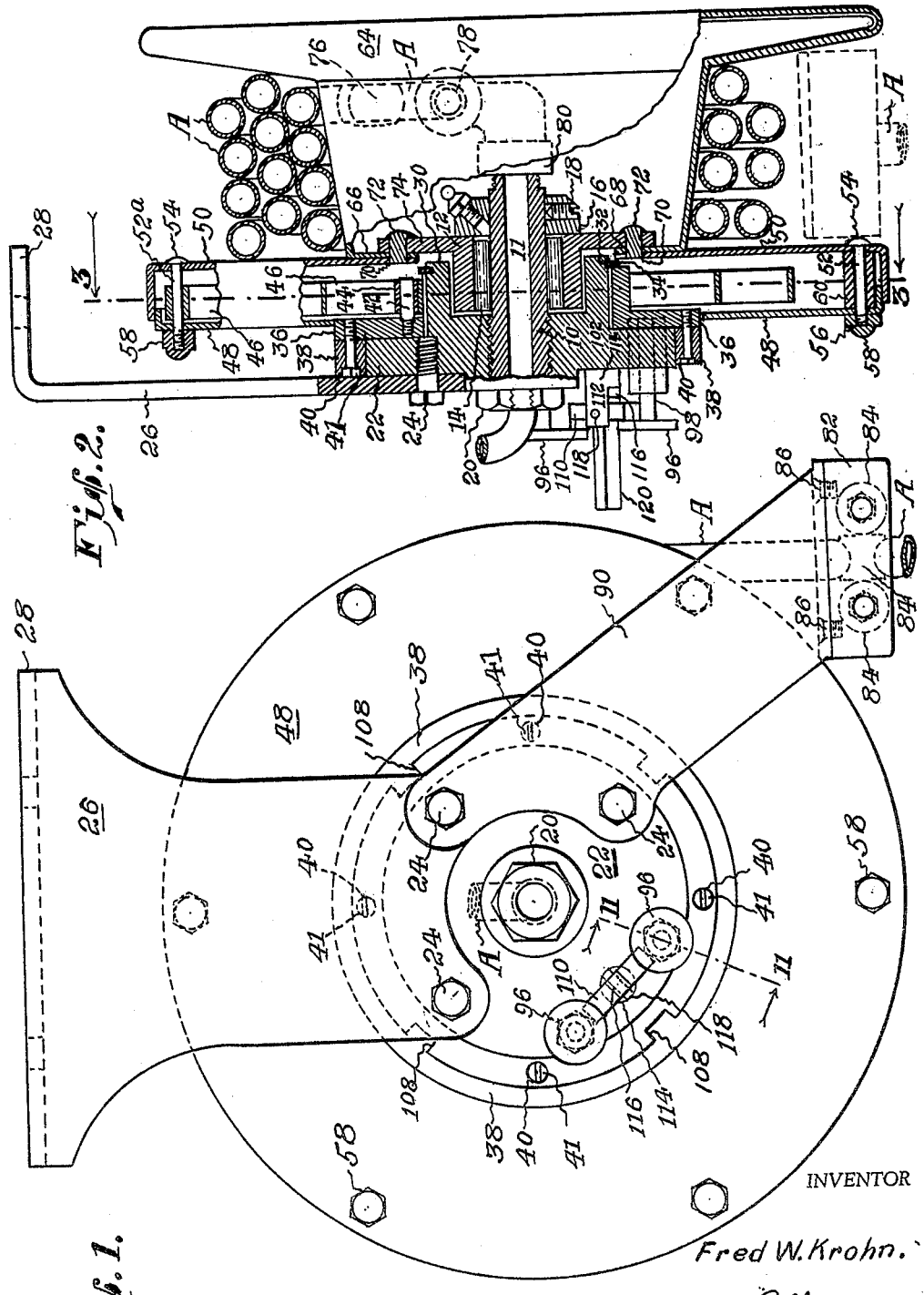

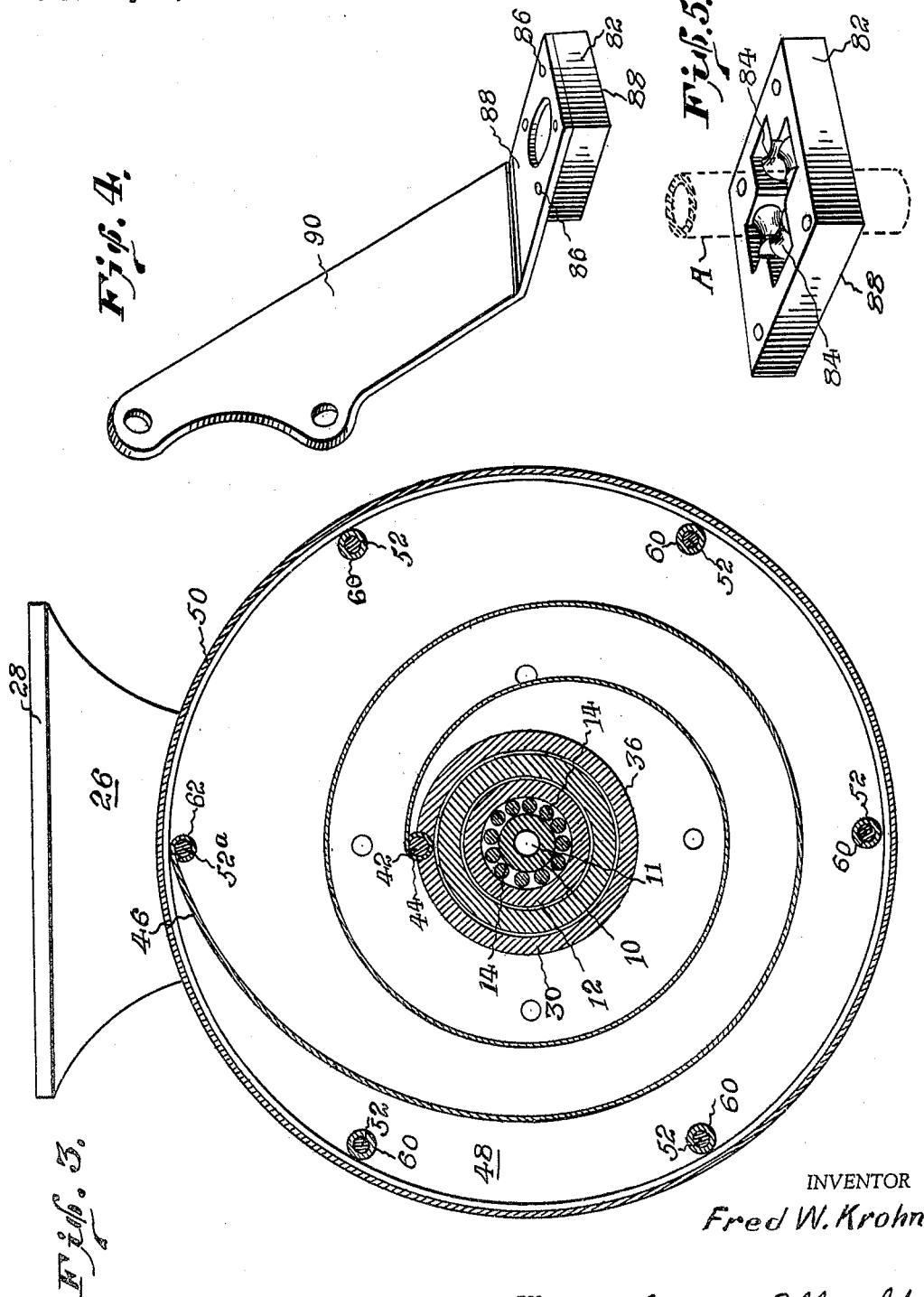

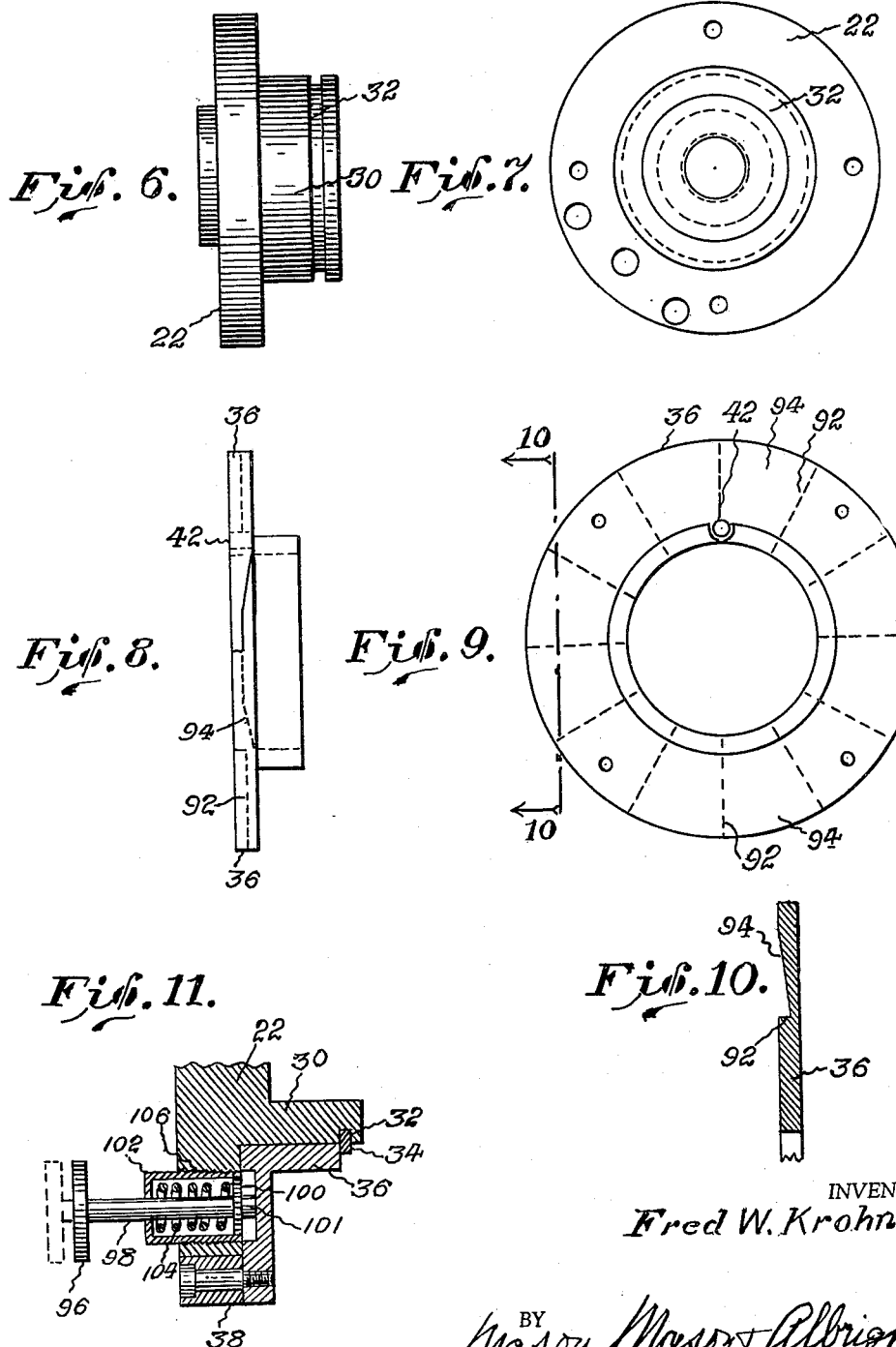

3,093,342
INDUSTRIAL TYPE REEL AND BALANCER
Fred W. Krohn, Detroit, Mich., assignor to Walter Machine and Screw Company, Detroit, Mich., a corporation of Michigan
Filed May 18, 1960, Ser. No. 29,894
4 Claims. (Cl. 242—107.5)

This invention relates to an industrial type reel of the kind used extensively in manufacturing plants, particularly those plants provided with production line equipment. Various types of hand tools are used by workers stationed along the production line, such as pneumatic riveters, electric drills, spot welders, and the like. Ordinarily the weight of the tool must be balanced in order to minimize the physical effort needed to hold the tool. Heretofore a balancer has been employed for this purpose that comprises a piece of equipment that is separate from the reel. In such cases, the balancer permits the operator of the tool to adjust or counterbalance the weight of the tool he is using. The reel merely acts as a drum on which the air hose or electric cable is wound. The device may be used either in connection with production line equipment or without it.

The principal object of the invention is to provide a reel for use where needed, having tension adjusting means whereby the weight of the tool can be accurately balanced by mechanism in the reel itself.

Another object is the provision of novel adjusting means in the reel for adjusting the counterbalancing of the weight of the tool being operated by the user of the car-operated nut driver, drills, riveter, or other pieces of equipment used by the operator.

A further object is to provide readily accessible means for adjusting the tension on the reel without taking the same apart, and even during the operation of the reel.

Other objects will appear hereinafter throughout the specification.

In the drawings:
FIGURE 1 is a side elevation of the device;
FIGURE 2 is a side elevation partly in vertical section of the structure shown in FIGURE 1;
FIGURE 3 is a section on the line 3—3 of FIGURE 2;
FIGURE 4 is a perspective view of one of the guide arms or brackets for the hose or wire guide;
FIGURE 5 is a view of the hose or wire guide;
FIGURE 6 is an end elevation of one element of the clutch adjusting lock;
FIGURE 7 is a front elevation of the structure shown in FIGURE 6;
FIGURE 8 is an end elevation of another element of the clutch adjusting lock;
FIGURE 9 is a front elevation of the structure of FIGURE 8;
FIGURE 10 is a section on the line 10—10 of FIGURE 9; and
FIGURE 11 is a detail section view taken on line 11—11 of FIGURE 1, showing one of the push button devices and its mounting.

It will be understood that the reel is mounted on a support which is above the work.

Referring now to the several figures of the drawings, the numeral 10 indicates the hollow stationary shaft having a passageway 11. Mounted on the shaft so as to rotate freely thereon is a bearing member 12. Roller bearings indicated by the numeral 14 support the member on shaft 10. It will be noted that the member 12 forms the support for the reel which will be described hereinafter.

Member 12 is held in position by a shaft retainer 16, the retainer being held in fixed position by the lock screw 18 shown in FIGURE 2.

The opposite end of the shaft 10 has an integral hexagonal head 20. Shaft 10 is supported by a stationary ring 22, the ring being held by a pair of bolts 24 to the hanger 26 that is supported from an overhead support (not shown) by flange 28.

Stationary ring 22 has an extension 30 of ring-like shape. Said extension is provided with a circular groove 32 for the reception of a Spirolox ring 34.

Mounted exteriorly of the stationary ring 22 is an adjustable L-shaped ring 36. The latter ring is provided with a removable ring 38 having a series of peripheral sockets 40, as seen in FIGURE 1, for receiving bolts 41 that connect ring 38 to the adjustable ring 36.

The inner portion of adjustable ring 36 is provided with a stud 42 forming a support for the inner circular end 44 of the clock-type spring 46. The spring 46 is housed within a pair of spring covers 48 and 50. As seen in FIGURE 2, these covers are partly telescoped and are held to each other by a series of bolts 52. Such bolts are provided with heads 54 and screw-threaded ends 56 for the reception of nuts 58. There are preferably about six of these bolts and all but one of them are provided with spacing sleeves 60. As shown at the upper portion of FIGURE 2, one of the bolts forms a holding means for the opposite end of the spring 46. The outer circular end 62, as shown in FIGURE 3, encircles the bolt 52a.

Referring particularly to FIGURES 1 to 3, the reel or drum is indictaed by the numeral 64. This drum is provided with an inwardly extending flange 66 having a series of apertures 68. These apertures are in alignment with a series of apertures 70 of the spring cover 50. Such apertures fixedly connect the spring covers 48 and 50 and one end of the spring, as well as the drum 64 by means of circumferentially spaced rivets 72. These rivets extend through a circular flange 74, forming an integral part of bearing member 12.

As will be noted by referring to FIGURE 2, the reel 64 supports a hose indicated by the letter A. One end of this hose extends through an opening 76 of the reel that is connected to a fitting indicated in dotted lines in FIGURE 2 at 78. This fitting is in the form of a right-angled coupling whose end 80 is connected by a rotary joint to the right end of the hollow stationary shaft 10. The other end of the hose extends through a guide indicated by the numeral 82, in FIGURES 1, 4 and 5. This guide is provided with a plurality of rollers 84, and the guide is rigidly attached by means of the series of rivets 86 to the flat portion 88 of a supporting arm 90, whose other end is provided with apertures (not shown) for the reception of the bolts 24, whereby the said arm may be affixed to the stationary ring 22, as shown in FIGURE 1.

It will be appreciated that the other end of the hose A (not shown) is attached to a suitable tool. Instead of providing a hose, which is shown merely for illustrative purposes, an electric cable may be used with a tool such as a welding tool or riveting tool attached to the said end.

When the tool (not shown) is grasped and pulled downwardly, the spring drum rotates, spring covers and upper end of the spring 46 rotate in a clockwise direction, the latter being rotated by a bolt 52a.

Initial tension, however, may be applied to the spring by partially coiling the same, and then locking the spring in this position. When the drum is then rotated as the tool on the end of the hose or wire is used, the spring will wind even tighter, applying greater winding force to the spring, the coils of which become more tightly coiled due to the initial setting of the coil. The above is accomplished by means of a slip clutch adjustment by the adjustable ring 36 which mounts the inner end 44 of the spring 46. This adjustable ring is partially rotated and held in this position before the hose or wire is unwound from the reel 64. Such adjustment is accomplished by reason of the fact that one of the radial faces, namely the left radial face, as viewed in FIGURE 2, of the ring 36 is provided with a plurality of steps 92 and inclined faces 94. A spring-pressed plunger, shown in FIGURE 11, is adapted to engage behind one of the shoulders or steps 92 of the adjustable ring 36. The locking mechanism comprises a pair of ratchet buttons 96. Each ratchet button, as shown in FIGURE 11, is provided with a stem 98 and a plunger 100 having a plunger end 101 that engages step 92. The plungers move, as seen in FIGURE 11, within a housing 102, being urged to the right by a compression spring 104. The entire assemblage is mounted by a screw-threaded connection 106 within a threaded aperture in the stationary ring 22.

In addition to pressing the spring-pressed plunger 100 to the right to cause its end 101 to engage against one of the shoulders 92, this spring-pressed plunger also forces the adjustable ring 36 to the right, as viewed in FIGURE 2, so as to frictionally engage the Spirolox ring 34. There is therefore a frictional drag on the movement of the ring 36, due to the pressing of the ring 36 against the ring 34.

The removable ring 38 which is integral with adjustable ring 36 is provided with a plurality of peripheral notches 108, as seen in FIGURE 1. These notches may be engaged by a spanner wrench so as to rotate the ring 36 until the plunger end 101 engages in the next succeeding notch formed by shoulder 92 and inclined portion 94.

There is a post 114 which screw-threadedly engages the stationary ring 22. This post is provided with a slot 116. The crossbar 110 is pivotally mountd at 118 in the slot 116 and extends beneath the two buttons 96, as shown in FIGURE 1. This crossbar has an integral extension or handle 120 forming a T.

By means of this arrangement, it is possible to partially wind the spring by using a spanner wrench in the notches 108 and hold the partially wound spring under tension by means of one of the plunger ends 101 as one of said ends 101 alternately engages behind the steps 92. The spring 46 is placed under tension when ring 36 is rotated clockwise and locked by one of the plunger ends 101. This initial winding of the inner end of the spring 46 and the holding of it in this position is performed when a heavy tool (not shown) is attached at the end of the hose or wire indicated by the letter A.

With the spring 46 partially under tension, when the hose or wire A is pulled off the reel, the reel is rotated but under greater tension than before, due to the partial winding of the inner spring end by rotating and locking ring 36. It will be noted that one of the plungers 101 is against a shoulder 92 and the other is on an inclined portion 94 of adjustable ring 36. When the handle 120 is rocked on its pivot 118 it pushes one button 96 up and permits the spring 104 to push the other button and its plunger down and thus makes a ratchet effect relative to the engagement and release of the plungers in the several shoulders 92. In other words, the handle 120 when rocked in one direction will release a button so that its spring 104 may press the plunger inward while it holds the other button to the left, as viewed in FIGURE 2, to release the end of that plunger from the shoulder 92 with which it has been in engagement.

With the construction described above, an adjustment may be made in all cases to compensate for lighter or heavier tools, which are supported in the end of the cable or hose indicated by the letter A, thus serving to balance the weight of the tool. It is not necessary to unwind or rewind the hose at all in order to provide an adjustment, inasmuch as the adjustment is made at the inner end of the spring, the latter being anchored to the adjustable ring 36, which latter may be rotated by a spanner wrench which would engage the peripheral notches 108 in said ring. It will be understood in this connection that the removable ring 38, adjustable ring 36 and bolts 42 are rigidly connected to each other and rotate as an entity. In other words, the ring composed of these parts is adjustably held when rotated in one direction by engagement of one of the plungers 101 with the notches 92 and may be released automatically for rotation in the opposite direction by the spring 46 when one of the said plungers is pulled out of these notches.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. An adjustable reel comprising a stationary supporting means including a stationary ring, a clock spring having inner and outer ends, an adjustable L-shaped ring adjustably mounted on said stationary ring, means connecting the inner end of said spring to said adjustable ring, a reel, means extending transversely to the plane of said adjustable ring for connecting said reel to the outer end of said spring, a stationary shaft for mounting said reel, a bearing member for supporting said reel on said stationary shaft, said bearing member being located radially inwardly of said adjustable ring and on one side of said reel.

2. The structure of claim 1 wherein said shaft is provided with a central passageway therethrough.

3. The structure of claim 1 wherein said adjustable ring is provided with locking means for locking said ring in a plurality of adjusted positions whereby to increase or decrease the initial tension on said spring.

4. The structure of claim 1 wherein said adjustable ring is provided with a radial face having a plurality of locking surfaces thereon and plunger means mounted on said supporting means for engaging one of said locking surfaces.

References Cited in the file of this patent

UNITED STATES PATENTS

| | | |
|---|---|---|
| 962,099 | Reinhart et al. | June 21, 1910 |
| 1,624,414 | Llewellyn et al. | Apr. 12, 1927 |
| 1,926,452 | Norling | Sept. 12, 1933 |
| 1,927,216 | Porter et al. | Sept. 19, 1933 |
| 2,306,611 | Benjamin | Dec. 29, 1942 |
| 2,401,809 | Ziegler | June 11, 1946 |